United States Statutory Invention Registration [19]

[11] Reg. Number: H589

Sartore

[43] Published: Feb. 7, 1989

[54] MEASUREMENT OF FILM THICKNESS OF INTEGRATED CIRCUITS

[75] Inventor: Richard G. Sartore, Bradley Beach, N.J.

[73] Assignee: The United States of America as represented by the Secretary of the Army, Washington, D.C.

[21] Appl. No.: 43,271

[22] Filed: Apr. 23, 1987

[51] Int. Cl.[4] ..... G01N 23/00
[52] U.S. Cl. ..... 250/307; 250/310
[58] Field of Search ..... 250/306, 307, 310

[56] References Cited

U.S. PATENT DOCUMENTS 3,376,419 4/1968 Schumacher ..... 250/307

FOREIGN PATENT DOCUMENTS 1080787 10/1967 United Kingdom .

OTHER PUBLICATIONS

Hormztz et al., "Use of SEM for plating thickness mesurement," Scan. Elec. Microscopy, Apr. 1976.
"Determination of Kilovolt Electron Energy Dissipation vs. Penetration Distance in Solid Materials" by T. E. Everhart and P. H. Hoff, Journal of Applied Physics, vol. 42, No. 13, Dec. 1971, pp. 5837–5846.
"A Simple Analytical Method for Thin Film Analysis With Massive Pure Element Stanards"by Harvey Yakowitz and Dale E. Newbury Scanning Electron Microscopy/1976 (Part I) Proceedings of the Ninth Annual Scanning Electron Microscope Symposium, pp. 151–162.

*Primary Examiner*—Stephen C. Buczinski
*Assistant Examiner*—Linda J. Wallace
*Attorney, Agent, or Firm*—Sheldon Kanars; John K. Mullarney

[57] ABSTRACT

A narrow, high energy, electron beam is caused to impinge upon an integrated circuit. The accelerating voltage of the electron beam is increased in incremental steps (3 or more) so that the electrons penetrate into the film and then into the substrate. The transmitted electrons interact with the film and substrate materials to generate distinct X-rays. The relative X-ray intensities of the film material to that of the substrate material is utilized to determine the film thickness.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MEASUREMENT OF FILM THICKNESS OF INTEGRATED CIRCUITS

The invention described herein may be manufactured, used, and licensed by or for the Government for governmental purposes without the payment to me of any royalties thereon.

TECHNICAL FIELD

The present invention relates to a method of measuring the film thickness of integrated circuits using an energy dispersive X-ray analysis (EDXA) technique.

BACKGROUND OF THE INVENTION

During the course of failure analysis or quality inspection and evaluation of microelectronic parts (ICs), a distinct need to measure metallization or oxide thickness is required to evaluate the processing of chips and to perform failure analysis. A well known, prior art technique proposed for this purpose makes use of a Scanning Electron Microscope (SEM) in conjunction with an Energy Dispersive X-ray Analysis (EDXA) technique. This latter technique, commonly known as the Yakowitz-Newbury method, has unfortunately proved too time consuming in practice, it requires high accelerating voltage and consistently estimates the thickness of films at a higher value than the actual value. The inaccuracy of the Yakowitz-Newbury method is, in part, attributed to the relatively large thickness of the integrated circuit films, e.g., approximately 1 micron for aluminum films and 0.5 to 0.8 microns for silicon diode/silicon nitride. Moreover, the high accelerating voltage required by this prior art technique often results in damage to the integrated circuit(s).

SUMMARY OF THE INVENTION

It is the primary object of the present invention to achieve a method or technique for measuring the film thickness of integrated circuits which is simple to implement, uses relatively low accelerating voltages, and yet achieves good measurement accuracy.

A related object is to obtain an accurate measurement of integrated circuit film thicknesses in a relatively fast, yet nondestructive, manner.

The above and other objects are achieved in accordance with the present invention wherein an accelerating electron beam voltage is increased in incremental steps (3 or more) so as to detect the penetration of the electron beam through an integrated circuit thin film. Once the electron beam is of sufficient energy to penetrate the film, the transmitted electrons interact with the substrate material to generate X-rays. The relative X-ray intensities of the film material to that of the substrate material can be used (e.g., plotted) to obtain a close estimate of the accelerating voltage required to penetrate the film. This threshold value for film penetration voltage is then used, in conjunction with a range-energy formula, to closely estimate the electron range and its correlate to film thickness.

BRIEF DESCRIPTION OF THE DRAWINGS

The invention will be more fully appreciated from the following detailed description when the same is considered in connection with the accompanying drawing, in which.

DETAILED DESCRIPTION

Figure 1:
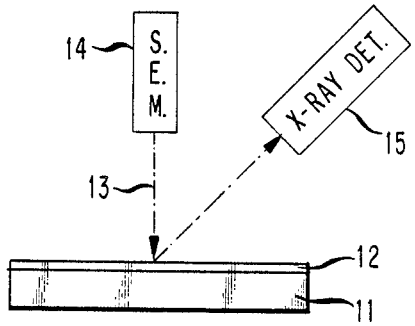
FIG. 1 is a schematic block diagram of the apparatus arrangement used in carrying out the technique of the present invention.

Turning now to FIG. 1 of the drawings, the integrated circuit 11 comprises a film 12 of Al or $SiO_2$, for example, which is etched or processed to a particular design specification. It is the purpose of the present invention to measure the thickness of this film. To this end, a narrow, high energy, electron beam 13 is generated by a scanning electron microscope (SEM) 14 and impinges upon the integrated circuit (IC). As is known to those in the art, the electron beam can be directed to a very specific point on the chip (+/− on micron). As the accelerating voltage of the electron beam 13 is increased in intensity the electrons will penetrate further into the chip. As a consequence, the transmitted electrons interact with the material(s) of the chip to generate X-rays. These X-rays are then detected by the X-ray detector 15, which is a commercially available item. The X-rays from the film and from the substrate are distinct since they are of different wavelengths ($\lambda$).

Figure 2:
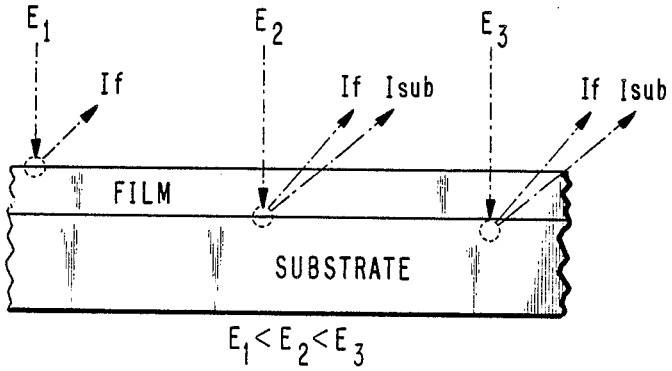
FIG. 2 is an enlarged showing of a portion of an integrated circuit and successive electron beam penetrations therethrough.

FIG. 2 illustrates an integrated circuit chip and impinging electron beams of differing energies E1, E2 and E3, where $E1<E2<E3$. The three beams would, of course, be directed to the same point or spot on the chip, but for illustrative purposes they are shown impinging upon three different points. The electron beam E1 is of relatively low energy so that it penetrates the film to a small extent. As the variable accelerating voltage is increased the electron beam represented as E2 penetrates the film to its interface with the substrate material. With a further increase in the accelerating voltage, the electron beam represented as E3 will penetrate into the substrate. The arrows labeled If and Isub represent the X-ray intensities which result from the interaction of the electrons with the film and substrate materials, respectively. As will be understood by those in the art, the further the electron beam penetrates into a material (e.g., the substrate) the greater the intensity of the generated X-rays.

Before turning to the theoretical basis for the method of the present invention, and at the possible risk of some redundancy, it may perhaps be advantageous to summarize at this point the significant aspects of this method invention. Basically, this method or technique uses a variable accelerating voltage to detect the penetration of the electron beam through a thin film (i.e., an etched or processed integrated circuit) using an energy dispersive X-ray analysis (EDXA) technique. Once the electrons have sufficient energy to penetrate the film, the transmitted electrons can interact with the substrate material to generate X-rays. By plotting the relative X-ray intensities of the film material to the substrate material, a close estimate of the accelerating voltage required for film penetration can be made. This threshold value for the film penetration voltage can be used in conjunction with a range-energy formula to estimate electron range and corollate to the film thickness.

Implementation of this method requires localization of the electron beam on the area of interest. This can be done with high accuracy and resolution, in contrast to optical methods. A minimum of three (and preferably more) X-ray intensity readings beyond penetration is required to give a fair estimate of the penetration voltage. The greater the number of incremental increases in the accelerating voltage, the greater the accuracy in film thickness measurement.

It has been found that reasonable statistics can be obtained for all three readings within a period of minutes. A simple calculation is then employed to obtain the film thickness.

The implementation of this technique is relatively insensitive to the electron microscope operating conditions and can tolerate variations in the electron beam parameters, provided the accelerating voltage is stable and accurate during measurement and data accumulation.

To examine the theoretical basis of the present penetration voltage method and to determine the appropriate formalism for implementing this method, two empirical/theoretical based formalisms are investigated, namely, Yakowitz-Newbury (Yakowitz-Newbury, 1976) and the Everhart-Hoff (Everhart-Hoff, 1971) formulations.

In the Yakowitz-Newbury formulation, k defines the ratio of the X-ray intensity from the film (If) to the X-ray intensity of the bulk sample of the same material as the film (Ibf):

$$K = If/Ibf \tag{1}$$

Further, taking the case of the electron beam penetrating the film, then it follows that If < Ibf. In this case, to a first approximation, the X-ray intensity generated in the substrate material (Isub) can be expressed as:

$$Isub = C(Ibf - If), \tag{2}$$

since any part of the electron beam not dissipated in the film will be dissipated in the substrate. C is an arbitrary constant to account for other effects, such as those arising at the interface. Dividing by If, the following useful expression is obtained:

$$\begin{aligned} \frac{Isub}{If} &= C(Isub/If - 1) \\ &= C(1/k - 1) \end{aligned} \tag{3}$$

This expression (Eq.3) will allow the determination of the penetration energy by plotting (1/k−1) vs. the electron beam energy. For the calculations, it was assumed that a 1 micron thick aluminum film was deposited on a silicon substrate. The k factor was calculated for various energies and (1/k−1) plotted, as shown in FIG. 3.

Figure 3:
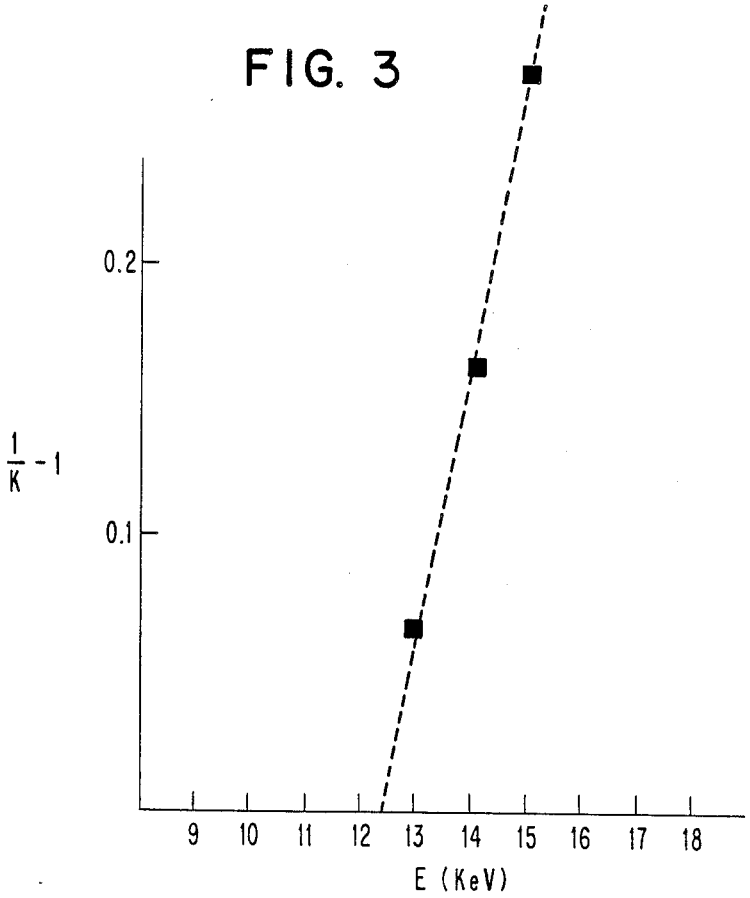
FIG. 3 is plot using Yakowitz-Newbury calculations which allow for the determination of penetration energy.

Referring to FIG. 3, the penetration energy obtained at the intersection of the line with the energy axis is approximately 12.3 keV. Using various range-energy formulas, such as depth-dose (Everhart-Hoff, 1971) or the Heinrich formula (Yakowitz-Newbury, 1976), the respective thicknesses obtained for the penetration voltage are 1.2 microns and 1.58 microns. Clearly, to obtain the correct value for the film thickness, a correction factor of 0.83 or 0.63 respectively would be required. Further, actual experimental measurements on aluminum films gave similar results, where the Yakowitz-Newbury method estimated the film thickness much higher than the actual value of the film thickness.

To improve on the high estimation bias obtained with the above method, another thickness estimation method was employed, based on the Everhart-Hoff formulation. Using the depth-dose formalisms, the beam energy dissipated in the material is given by:

$$P = \int_o^y Z(y)dy \tag{4}$$

where Z is the normalize energy loss parameter, and y is the normalize depth. Using the simplified assumption that the energy of the electron beam, not dissipated in the film, will be dissipated in the subtrate, the following expression is obtained for the X-ray intensity ratio:

$$\frac{Isub}{If} = C\frac{1 - Pf}{Pf} \tag{5}$$

where $$Pf = \int_o^{yf} Z(y)dy, \tag{6}$$

and yf is the normalized thickness of the film. Using this expression (Eq.5) a plot of Isub/If vs. electron beam energy can be obtained. Assuming as before, a 1 micron thick aluminum film on a silicon substrate, the plot of Isub/If is shown in FIG. 4.

Figure 4:
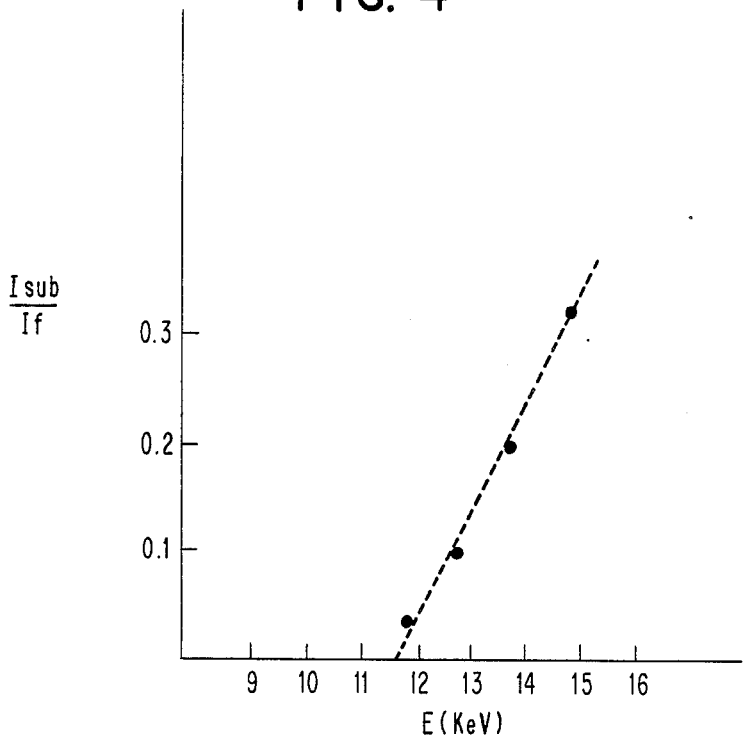
FIG. 4 is a predicted or theoretical plot of relative X-ray intensities (Isub/If) vs. beam energy (E) in accordance with the technique of the present invention.

The penetration energy obtained from the plot of FIG. 4 is approximately 11.5 keV. The Everhart-Hoff formalism, in combination with the depth-dose range-energy relation, gives the best results for estimating the thickness of aluminum film on integrated circuits. The above discussed formalisms confirm the correctness of the experimental method as an estimation technique for the penetration voltage. The depth-dose relation was used to estimate the film thickness from the penetration voltage. This concludes the theoretical discussion of the basis for the voltage penetration method of the present invention and, in turn, establishes the basis for the approach set forth below on the experimental procedures.

To calibrate this method with respect to a secondary length standard, an aluminum film of approximately 1 micron was deposited on two silicon wafers. One wafer was coated with a thin film of gold and the other was left uncoated. These wafers were fractured and the thickness of the aluminum film was measured visually by using an SEM. The calibrated micron marker of SEM was compared to a secondary length standard (diffraction grading). This secondary standard was, in turn, calibrated with respect to the NBS SRM 484. Based on this procedure, the SEM measurement of the film thickness is the most accurate of all the methods described herein, since it can be traced to a "primary" length standard from the NBS. This visual SEM measurement technique is, of course, a destructive one.

Figure 5:
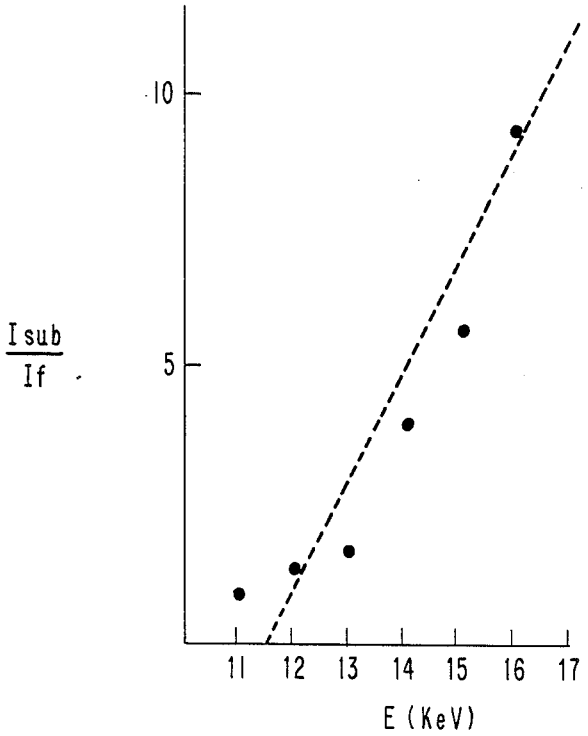
FIG. 5 is the actual or experimental data obtained for an Isub/If vs. beam energy plot.

The EDXA technique of the present invention was used to measure the film thickness in the vicinity of the SEM thickness measurements. As described previously, the accelerating voltage of the SEM was varied until the e-beam penetrated the aluminum film and a weak silicon peak was observed. At this point, the voltage was increased in steps of 1 keV and the X-ray spectra was taken at each step. The relative ratio of silicon to aluminum (Isi/Ial) was then plotted vs. accelerating voltage (see FIG. 5). Enough data was taken to extrapolate back to the penetration voltage. Usually, this required a minimum of three to four data points beyond the initial detection of substrate material. Further, enough counts were accumulated at each point to give a peak count for the film above 30 k. Typically, the plot of the data is as shown in FIG. 5. A least squares fit of the data points, above the minimum point, to a straight line, will allow an estimation of the penetration voltage at the intersection with the energy axis.

TABLE I

| | Estimated Penetration Voltage (keV) | | | |
|---|---|---|---|---|
| | Al Film (uncoated) | Al Film (coated) | IC#1 (uncoated) | IC#2 (uncoated) |
| Peak Ratio (Isi/Ial) | 10.21 | 11.44 | 12.89 | 13.16 |
| K Ratio (Ksi/Kal) | 10.52 | 11.25 | — | — |

(Uncertainty of +/− 0.2 keV)

In the table the first column represents a thin film or wafer of aluminum which is unetched; the second column represents a thin wafer of aluminum also unetched, but gold coated; the columns labeled IC#1 and IC#2 represent two integrated circuit chip samples made of aluminum film with a silicon substrate. The latter samples are production samples which are etched or fabricated IC chips. The K ratio was obtained for values produced after performing a semiquantitative analysis on each spectra. The quickest way for implementing above procedure was by using peak ratio (Isi/Ial), since it didn't require further analysis or comparison to standards. Also, the peak ratio was relatively insensitive to SEM operating parameters as compared to other ratios.

When the estimated penetration voltage of the film is obtained, a close estimation of its thickness can be obtained using an available range-energy formula. The depth-dose formula (Everhart-Hoff, 1971) was used here:

$$T=40\times E^{1.75}/p \quad (7)$$

where T equals thickness of film (microns), E equals electron-beam accelerating voltage (keV) and P equals density (mg/cm$^3$). Using this equation to determine film thickness, the results in Table II are obtained and these are compared with the SEM measurements The columns are as previously described. While the estimated penetration voltage (E) might be obtained from a plot such as shown in FIG. 5, in practice the raw data would be delivered to a computer which would readily extrapolate from the same to obtain a close estimation of the penetration voltage (E).

TABLE II

| | Film Thickness Measurements(Microns) | | | |
|---|---|---|---|---|
| | Al Film (uncoated) | Al Film (coated) | IC#1 (uncoated) | IC#2 (uncoated) |
| Peak Ratio | 0.863+/−.04 | 1.053+/−.04 | 1.298+/−.05 | 1.346+/−.05 |
| K Ratio | 0.909+/−.04 | 1.023+/−.04 | — | — |
| SEM(visual) | 1.00+/−.034 | 1.170+/−.04 | 1.55+/−.13 | 1.479+/−.12 |

These results using the penetration voltage method of the invention are reasonable and give a credible estimate for the thickness of aluminum films. In contrast, use of the Yakowitz-Newbury technique consistently gave film thickness estimates that were larger in value than the actual measured values, for the range of thicknesses and SEM operating parameters used for this experiment. Further, the Yakowitz-Newbury method requires much higher accelerating voltages to obtain thickness estimates than the present penetration voltage method. The higher accelerating voltages required by Yakowitz-Newbury can damage the integrated circuit, causing the device to malfunction electrically. With the present penetration voltage method, there is far less likelihood of damage and, at worst, may only lead to degradation of parameters rather than complete destruction or malfunction of the integrated circuit. Also, damage or degradation can be further limited for sensitive circuits by restricting the probing and measurements to the peripheral area of the chip where none of the critically active circuit elements are located. Based on the results obtained, the penetration voltage method gives a reasonable and fairly accurate measurement of the film thickness of an integrated circuit with a minimum of possible damage to the electrical functionality of the device.

To obtain even more precise estimates of the film thickness, a correction factor was applied to give a one micron thickness for the uncoated, peak ratio reading. This would correspond with the SEM visual analysis of that film. Applying the same correction to all the other samples, the results in table 3 are obtained.

TABLE III

| | Corrected Thickness Estimates(Microns) | | | |
|---|---|---|---|---|
| | Al Film (uncoated) | Al Film (coated) | IC#1 (uncoated) | IC#2 (uncoated) |
| Peak Ratio | 1.00 | 1.22 | 1.50 | 1.56 |
| K Ratio | 1.05 | 1.18 | — | — |
| SEM(visual) | 1.0 | 1.17 | 1.55 | 1.497 |

These results correspond very closely with the SEM analysis values, which can be traced to secondary and NBS length standards. Based on the close correlation of the corrected penetration voltage thickness estimates with the SEM visual, the correction factor is valid for all four samples, taken from different sources. Based on these results, the correction factor can be utilized for other aluminum film samples to more closely estimate the film thickness.

Similar results were obtained for silicon dioxide/silicon nitride films, such as, passivation on integrated circuits. Typical results for a hybrid integrated circuit chip are given in table IV.

TABLE IV

| Silicon Dioxide/Nitride Film Thickness | | |
|---|---|---|
| | Penetration Voltage (keV) | Thickness (MICRON) |
| Peak Ratio | 4.41 | 0.2429+/−.03 |
| K Ratio | 4.64 | 0.2655+/−.03 |
| SEM(visual) | — | 0.1980+/−.03 |

Figure 6:
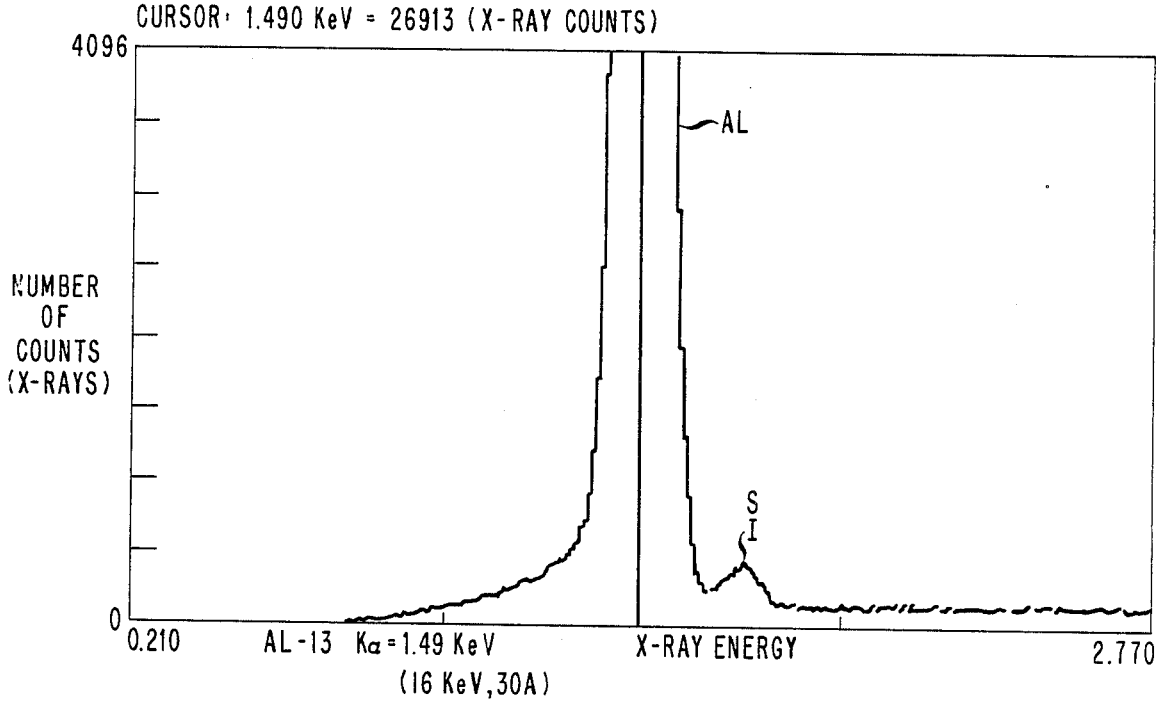
FIGS. 6–7 are waveforms showing typical X-ray counts obtained when an accelerating electron beam impinges upon and penetrates an aluminum thin film mounted on a silicon substrate.
Figure 7:
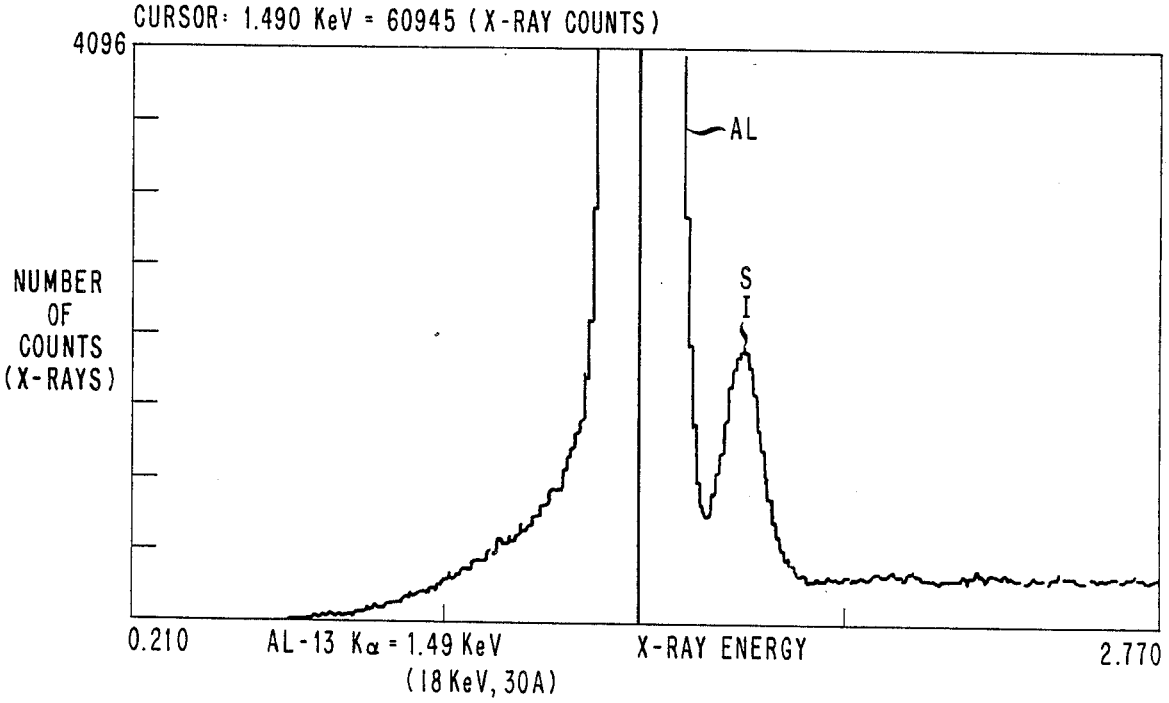

The results were obtained for a film of silicon dioxide. For a silicon nitride film, the penetration voltage thickness results would, most probably, have been closer to the SEM visual results and well within the error margin. These results are quite reasonable and clearly demonstrate the utility of the penetration voltage method and its applicability to silicon dioxide/nitride films. FIGS. 6–7 are plots of X-ray counts (ordinate) versus X-ray energy (abscissa) for an accelerating electron beam impinging upon an aluminum (atomic No. 13) film mounted upon a silicon substrate. The vertical scale only extends to a count of 4096. The horizontal scale extends from 0.210 keV to 2.770 keV, with the cursor (K $\alpha$) at 1.490 keV. An electron beam of 16 keV produces an (Al) X-ray count of 26,913 (FIG. 6). The X-ray count for the silicon substrate is negligibly small by comparison. This corresponds to the E2 situation indicated in FIG. 2. When the accelerating voltage is increased to 18 keV (FIG. 7), the electron beam penetrates into the substrate (E3, in FIG. 2) and the X-ray intensity from the substrate (Isub) increases significantly. The value of If, of course, also increases. The designation 30A indicates a 30° take-off angle.

The utility and accuracy of the penetration voltage method of the present invention as a means of obtaining the thickness of aluminum and silicon dioxide/nitride thin films on integrated circuits, in the 0.5 to 1.5 micron range, has been demonstrated. Further, it will be evident to those skilled in this art that this penetration voltage method has clear applicability to the measurement of thick films as well. It is anticipated that this method will prove to be a useful technique when used with MIL-STD 883, Method 2018.2.

Having thus shown and described what is at present considered to be the preferred method, it should be understood that the same has been shown by way of illustration and not limitation. Accordingly, all modifications, alterations and changes coming within the spirit and scope of the invention as defined in the appended claims are herein meant to be included.

What is claimed is:

1. A method of measuring the film thickness of integrated circuits comprising the steps of:

directing a narrow, high energy, electron beam to impinge upon an integrated circuit;

increasing in incremental steps of three or more the accelerating voltage of the electron beam so that the electrons penetrate into the film and with one or more further increases penetrate into the substrate of the integrated circuit to a predetermined extent;

the transmitted electrons serving to interact with the film and substrate materials to generate distinct X-rays;

detecting the generated X-rays;

the relative X-ray intensities of the film material to that of the substrate material being used to obtain a close estimate of the accelerating voltage required to penetrate the film;

determining the film penetration voltage in accordance with a least squares fitting of the relative X-ray intensity data points or readings; and calculating the film thickness (T) in accordance with the formula:

$$T=40\times E^{1.75}/P$$

where E=film penetration voltage, and p=film material density in mg/cm$^3$.

* * * * *